United States Patent [19]

Kon

[11] Patent Number: 5,228,779
[45] Date of Patent: Jul. 20, 1993

[54] METHOD AND APPARATUS FOR CALCULATING THERMAL SENSITIVITY

[75] Inventor: Akihiko Kon, Kanagawa, Japan

[73] Assignee: Yamatake-Honeywell Co., Ltd., Japan

[21] Appl. No.: 763,346

[22] Filed: Sep. 20, 1991

[30] Foreign Application Priority Data

Sep. 21, 1990 [JP] Japan .................. 2-250009

[51] Int. Cl.$^5$ ............................................. G01K 3/00
[52] U.S. Cl. ..................................... 374/109; 374/45
[58] Field of Search ................... 374/9, 10, 43, 44, 45, 374/109; 364/557

[56] References Cited

U.S. PATENT DOCUMENTS

| | | | |
|---|---|---|---|
| 4,058,254 | 11/1977 | Hallgreen | 374/109 X |
| 4,073,190 | 2/1978 | MacHattie et al. | 374/109 |
| 4,125,012 | 11/1978 | Madsen | 374/45 |
| 4,155,244 | 5/1979 | Bhattacharyya | 374/44 |
| 4,504,157 | 3/1985 | Crabtree et al. | 374/109 |
| 4,747,699 | 5/1988 | Kobayashi et al. | 374/109 |
| 4,890,932 | 1/1990 | Kobayashi et al. | 374/109 |

FOREIGN PATENT DOCUMENTS

| | | |
|---|---|---|
| 214294 | 3/1987 | European Pat. Off. . |
| 8908474 | 11/1989 | Fed. Rep. of Germany . |
| 2231018 | 5/1974 | France . |
| 2325915 | 9/1976 | France . |

OTHER PUBLICATIONS

"Thermal Environmental Conditions for Human Occupancy," ASHRAE, Jan. 1981.

Primary Examiner—William A. Cuchlinski, Jr.
Assistant Examiner—G. Bradley Bennett
Attorney, Agent, or Firm—Blakely, Sokoloff, Taylor & Zafman

[57] ABSTRACT

According to a method and apparatus for calculating thermal sensitivity, a set temperature $\theta_{(th)}$ is calculated on the basis of an air temperature Ta and a clothing thermal resistance Icl. Thermal energy $H\theta_{(th)}$ is supplied to a heater capable of adjusting a sensor temperature Tcr so as to set the sensor temperature Tcr to be equal to the set temperature $\theta_{(th)}$. The thermal sensitivity is calculated on the basis of the air temperature Ta, the clothing thermal resistance Icl, the set temperature $\theta_{(th)}$, and the thermal energy $H\theta_{(th)}$.

7 Claims, 3 Drawing Sheets

METHOD AND APPARATUS FOR CALCULATING THERMAL SENSITIVITY

BACKGROUND OF THE INVENTION

The present invention relates to a thermal sensitivity calculating apparatus for calculating thermal sensitivity, e.g., an equivalent temperature (Teq), felt by a human body.

An equivalent temperature Teq is used as an evaluation index of a thermal environment felt by a human body, i.e., thermal sensitivity.

As the first method of obtaining this equivalent temperature Teq, a method has been proposed, in which an equivalent temperature Teq* substantially equal to the equivalent temperature Teq is obtained by measuring a radiant temperature Tr, an air temperature Ta, and an air velocity Vair by using different sensors, and performing predetermined arithmetic processing of the measured values. This method requires complicated arithmetic processing, and the processing time is undesirably prolonged.

Under the circumstances, as the second method of obtaining the equivalent temperature Teq, a method is proposed, in which a heater is incorporated in a module main body, and the amount of power to be supplied to the heater is controlled to always keep a temperature (sensor temperature) $T_{cr}$ of the module main body to be a constant value (e.g., 36.5° C.). According to this method, the equivalent temperature Teq* can be calculated by measuring the amount of power to be supplied to the heater and performing predetermined arithmetic processing of the measured value.

In the second method described above, however, since an environment measuring section constituted by the module main body and the heater is much smaller than a human body, as is apparent, the air current sensitivity of the measuring section is much larger than that of the human body.

This difference in air current sensitivity indicates that the equivalent temperatures Teq and Teq* remain substantially equal to each other at an air velocity of less than 0.1 m/s but differ from each other when the air velocity is increased to 0.1 m/s or more. More specifically, at an air velocity of 0.1 m/s or more, the equivalent temperature Teq* becomes lower than the equivalent temperature Teq. As a result, accurate measurement cannot be performed.

According to the second method described above, however, there is a critical drawback that accurate measurement cannot be performed when the air velocity Vair is high, in spite of the advantage that the radiant temperature Tr, the air temperature Ta, and the air velocity Vair can be integrally measured, i.e., the advantage that the arithmetic processing can be simplified.

SUMMARY OF THE INVENTION

The invention has been made to solve the above-described problems, and has as its object, according to the first aspect and third aspect of the present invention, to provide a method and apparatus for calculating thermal sensitivity, in which a set temperature $\theta_{(th)}$ is calculated on the basis of an air temperature Ta and a clothing thermal resistance Icl, thermal energy $H\theta_{(th)}$ is supplied to heating means capable of adjusting a sensor temperature Tcr so as to set the set temperature $\theta_{(th)}$ to be equal to the sensor temperature Tcr, and the thermal sensitivity is calculated on the basis of the air temperature Ta, the clothing thermal resistance Icl, the set temperature $\theta_{(th)}$, and the thermal energy $H\theta_{(th)}$.

According to the second aspect and fourth aspect of the present invention, in the method and apparatus of the first and third aspects, an equivalent temperature Teq* is calculated as thermal sensitivity on the basis of the air temperature Ta, the set temperature $\theta_{(th)}$, the thermal energy $H\theta_{(th)}$, and coefficients $b_1$ to $b_4$ according to equation (a):

$$Teq^* = b_1 + b_2 \times \theta_{(th)} + b_3 \times Ta - b_4 H\theta_{(th)} \quad (a)$$

According to the first and third aspects of the present invention, therefore, the set temperature $\theta_{(th)}$ is determined on the basis of the air temperature Ta and the clothing thermal resistance Icl, and the thermal energy $H\theta_{(th)}$ is supplied to the heating means to set the set temperature $\theta_{(th)}$ to be equal to the sensor temperature Tcr. That is, the sensor temperature Tcr is controlled to be equal to the set temperature $\theta_{(th)}$ which is not constant and changes depending on environmental conditions. Thermal sensitivity is then calculated on the basis of the air temperature Ta, the clothing thermal resistance Icl, the set temperature $\theta_{(th)}$, and the thermal energy $H\theta_{(th)}$.

In addition according to the second and fourth aspects of the present invention, the equivalent temperature Teq* is calculated as thermal sensitivity by practically expressed equation (a).

DESCRIPTION OF THE PREFERRED EMBODIMENT

A thermal sensitivity calculating apparatus according to the present invention will be described in detail below.

Figure 2:
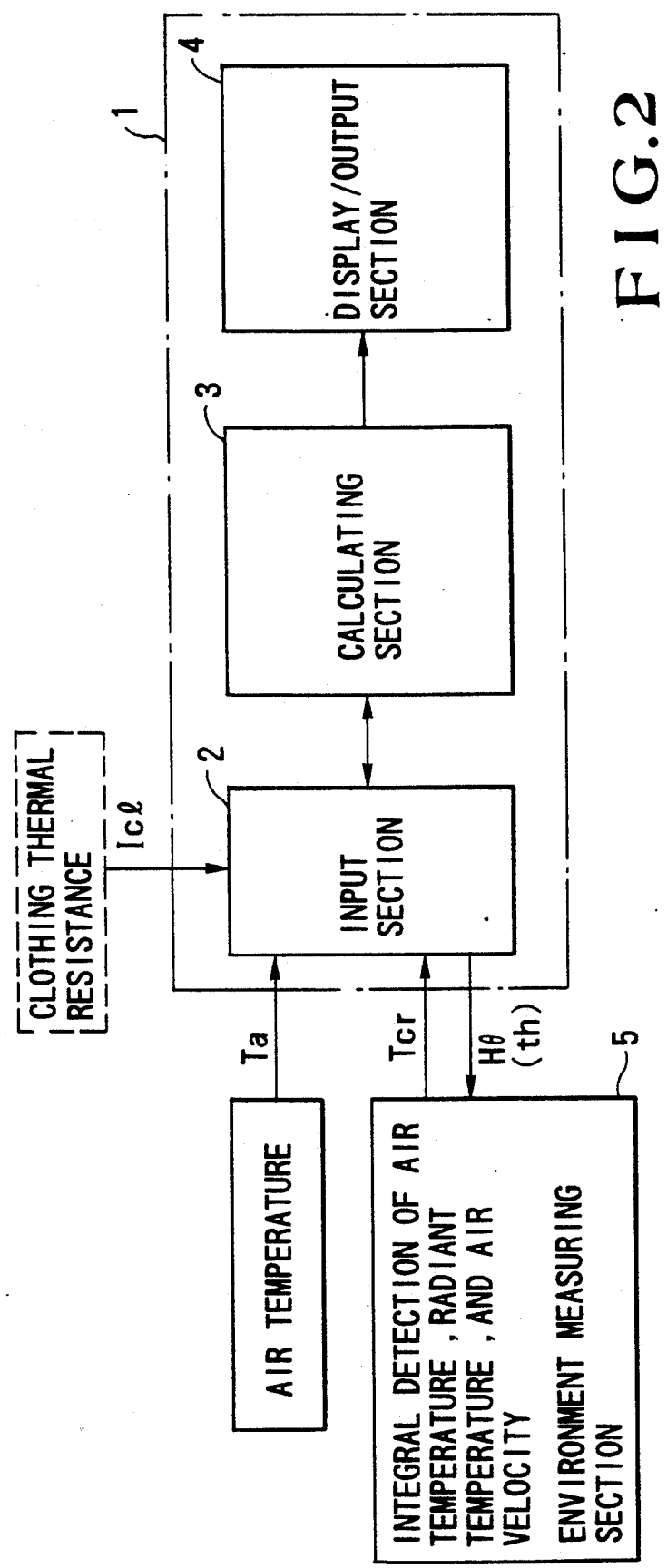
FIG. 2 is a block diagram showing the thermal sensitivity calculating apparatus according to an embodiment of the present invention.

FIG. 2 shows an embodiment of this thermal sensitivity calculating apparatus. A thermal sensitivity calculating apparatus 1 includes an input section 2, a calculating section 3, and a display/output section 4. The input section 2 receives not only a clothing thermal resistance Icl as a set value but also an air temperature Ta and a sensor temperature Tcr from an environment measuring section 5 as detection values. These set and detection values are then supplied from the input section 2 to the calculating section 3. The calculating section 3 then obtains a set temperature value $\theta_{(th)}$, heater power $H\theta_{(th)}$ as thermal energy, and an equivalent temperature Teq*.

Figure 1:
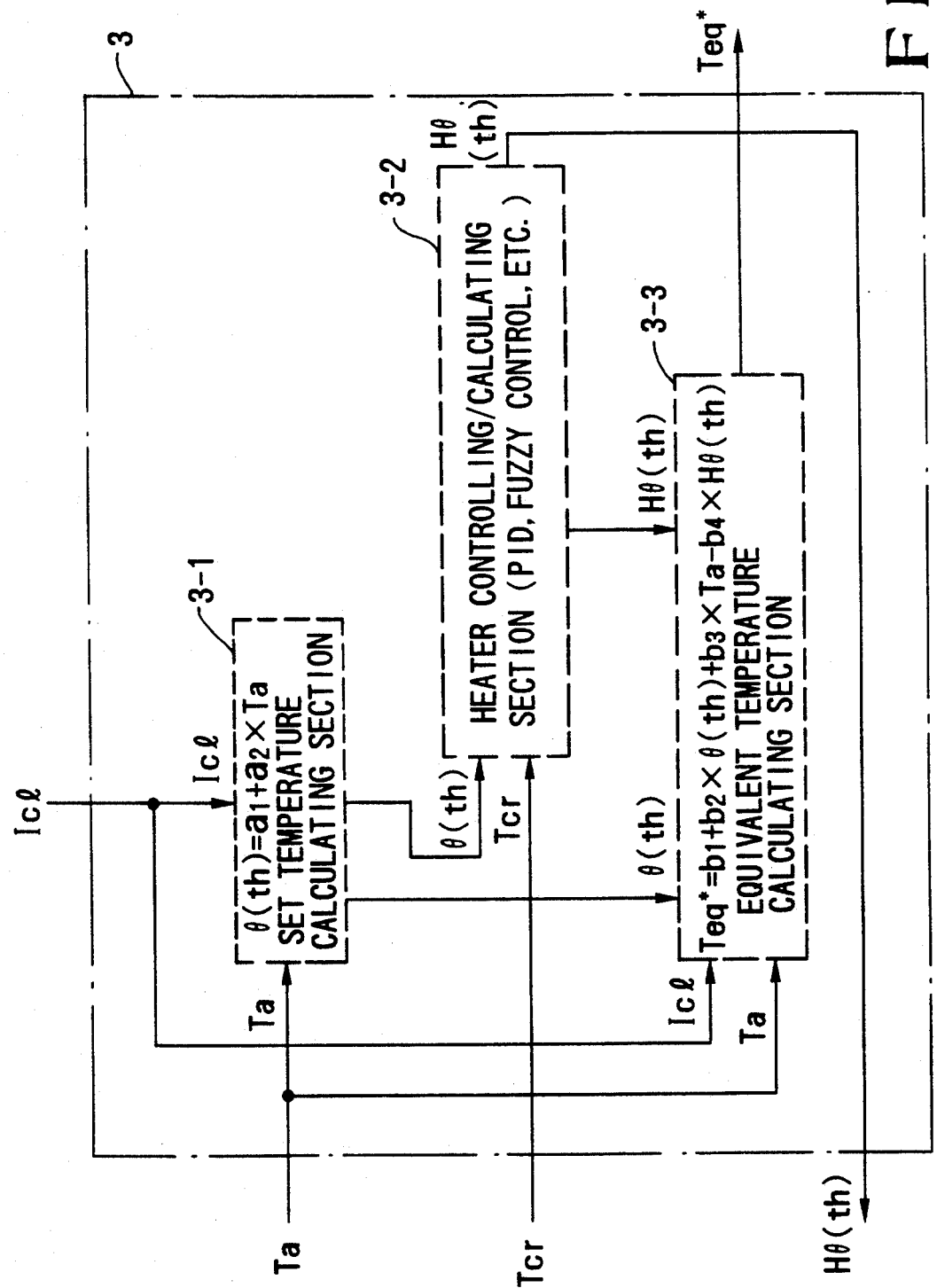
FIG. 1 is a block diagram showing a calculating section in a thermal sensitivity calculating apparatus shown in FIG. 2.

More specifically, in the calculating section 3, as shown in FIG. 1, the set temperature value $\theta_{(th)}$ is calculated by the following equation (1) on the basis of the air temperature Ta and the clothing thermal resistance Icl by using a set temperature calculating section 3-1. Note that values $a_1$ and $a_2$ in equation (1) will be described later.

$$\theta_{(th)} = a_1 + a_2 \times Ta \quad (1)$$

Subsequently, a heater controlling/calculating section 3-2 measures the heater power $H\theta_{(th)}$ (W) while performing PID control or fuzzy control to set the set temperature $\theta_{(th)}$ to be equal to the sensor temperature Tcr. The obtained heater power $H\theta_{(th)}$ (W) is supplied to the environment measuring section 5 through the input section 2.

Figure 3A:
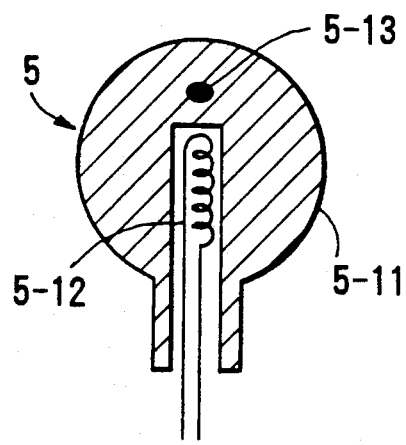
FIGS. 3(a) to 3(d) are schematic longitudinal sectional views showing an arrangement of an environment measuring section.
Figure 3B:
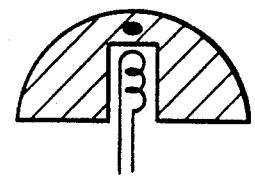
Figure 3C:
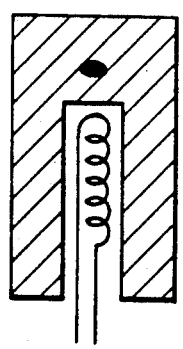
Figure 3D:
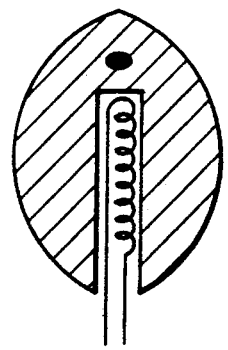

The environment measuring section 5 will be further described below. As shown in, e.g., FIG. 3(a), the environment measuring section 5 comprises a spherical module main body 5-11, a heater 5-12 arranged in the module main body 5-11, and a temperature sensor 5-13 arranged on the module main body 5-11. The module main body 5-11 consists of a metal having high thermal conductivity, such as copper or aluminum. The outer surface of the module main body 5-11 is formed to have high emissivity so as to be sensitive to a radiant temperature Tr. Note that the module main body 5-11 of the environment measuring section 5 may have a hemispherical shape, a cylindrical shape, or an elliptical shape, as shown in FIGS. 3(b), 3(c), and 3(d).

The above-mentioned heater power $H\theta_{(th)}$ is supplied to the heater 5-12 of the environment measuring section 5. The module main body 5-11 is then heated by the heater 5-12 and is controlled such that the sensor temperature Tcr detected by the temperature sensor 5-13 becomes equal to the set temperature $\theta_{(th)}$.

Subsequently, in an equivalent temperature calculating section 3-3, an equivalent temperature Teq* is calculated by the following equation (2) on the basis of the air temperature Ta, the clothing thermal resistance Icl, the set temperature $\theta_{(th)}$, and the heater power $H\theta_{(th)}$. Note that $b_1$, $b_2$, $b_3$, and $b_4$ in equation (2) will be described later.

$$Teq^* = b_1 + b_2 \times \theta_{(th)} + b_3 \times Ta - b_4 \times H\theta_{(th)} \quad (2)$$

The equivalent temperature Teq* obtained by the equivalent temperature calculating section 3-3 is supplied to the display/output section 4 to be displayed.

As described above, according to the thermal sensitivity calculating apparatus 1 of this embodiment, the set temperature $\theta_{(th)}$ is obtained on the basis of the clothing thermal resistance Icl and the air temperature Ta, and the heater power $H\theta_{(th)}$ to be supplied to the heater 5-12 is controlled such that the sensor temperature Tcr coincides with the set temperature $\theta_{(th)}$, thus calculating the equivalent temperature Teq* on the basis of the air temperature Ta, the clothing thermal resistance Icl, the set temperature $\theta_{(th)}$, and the heater power $H\theta_{(th)}$. Therefore, even if the air velocity Vair is high, the equivalent temperature Teq* coincides with the equivalent temperature Teq felt by a human body with high accuracy. This allows accurate measurement of an equivalent temperature.

The mechanism which allows coincidence between the equivalent temperature Teq* and the equivalent temperature Teq with high accuracy will be additionally described below.

Assuming that heater power to be supplied to the environment measuring section 5 is represented by H, the heat power H is reduced by environmental conditions (the air temperature Ta, the radiant temperature Tr, and the air velocity Vair). If the surface temperature of the module main body 5-11 is T (° C.), then $$H = Hr \times (T - Tr) + A \times Vair^n \times (T - Ta) \quad (3)$$

where Hr is a radiant temperature transfer coefficient, and A is the intrinsic factor of the environment measuring section 5.

Equation (3) can be rewritten into equation (4):

$$Tr - \frac{A}{Hr} \times Vair^n \times (T - Ta) = T - \frac{1}{Hr} \times H \quad (4)$$

The equivalent temperature Teq felt by a human body as formulated by Madsen [1979][1984] in consideration of an influence of the clothing insulation (Icl) is defined by equation (5) as follows:

$$Teq = 0.45 \times Tr + 0.55 \times Ta + \frac{0.24 - 0.75 \times Vair^{0.5}}{1 + Icl} \times (36.5 - Ta) \quad (5)$$

Where Ta is the air temperature, Tr is the mean radiant temperature, and Vair is the air velocity.

Madsen [1979][1984] formulates the equivalent temperature as a temperature sensed by a human body having a skin surface temperature of 36.5° in environments having a given air temperature, a given radiant temperature, and a given air velocity. Values of 0.55 and 0.45 indicate ratios of influences of the air temperature and the mean radiant temperature on the human body. The third term of the equation indicates an influence of the air velocity, i.e., that an amount of heat deprived from the skin surface increases with an increase in air velocity. The clothing insulation Icl in the denominator of the third term indicates that a decrease in body temperature is smaller in the man who wears the clothing than the naked man. In any case, the equation proposed by Madsen is soley related to the human body. It is apparent from the comparison between equations (4) and (5) that if $T = 36.5$ is set, and both the left- and right-hand sides of equation (4) are multiplied by a coefficient of 0.45, and both the sides are subsequently multiplied by $$0.55 \times Ta + \frac{0.24}{1 + Icl} \times (36.5 - Ta)$$

then, the resulting value is substantially equal to the equivalent temperature Teq. Therefore, equation (4) is rewritten as equation (6):

$$0.45 \times Tr + 0.55 \times Ta + \quad (6)$$

$$\frac{\left[ 0.24 - 0.45 \times A \times \frac{(1 + Icl)}{Hr} \times Vair^n \right]}{1 + Icl} \times$$

$$(36.5 - Ta) = 0.45 \times 36.5 + 0.55 \times Ta + \frac{0.24}{1 + Icl} \times$$

$$(36.5 - Ta) - \frac{0.45}{Hr} \times H$$

The difference between equations (6) and (5) resides in $$0.45 \times A \times \frac{(1 + Icl)}{Hr} \times Vair^n \text{ and } 0.75 \times Vair^{0.5}.$$

Since the environment measuring section 5 is small, its air velocity sensitivity inevitably becomes higher than that of a human body. That is, because of the surface effect of the environment measuring section 5, its air velocity sensitivity portion becomes larger than that of a human body to be $$0.45 \times A \times \frac{(1 + Icl)}{Hr} > 0.75$$

Since this inequality sign remains throughout the arithmetic processing, an accurate equivalent temperature cannot be obtained.

In this embodiment, therefore, in order to make the air velocity sensitivity of the environment measuring section 5 coincide with that of a human body, equations (6) and (5) are reconsidered in terms of temperature differences (36.5−Ta) as well as air velocity sensitivity coefficients such as the index value (n) of the air velocity. As a result, it is found that such coincidence can be achieved by controlling the heater power $H\theta_{(th)}$ supplied to the environment measuring section 5 at a temperature of $\theta_{(th)}°$ C. instead of 36.5° C. so as to establish the following equation:

$$0.45 \times A \times \frac{(1 + Icl)}{Hr} \times Vair^n \times (\theta_{(th)} - Ta) = \quad (7)$$

$$0.75 \times Vair^{0.5} \times (36.5 - Ta)$$

That is $$\theta_{(th)} = \frac{0.75}{0.45 \times A \times \frac{(1 + Icl)}{Hr}} \times \frac{Vair^{0.5}}{Vair^n} \times (36.5 - Ta) + Ta$$

Since n varies from 0.35 to 0.6 in the range of 0.1 to 1.0 m/s, $Vair^{0.5} \approx Vair^n$ can be established, and the set temperature $\theta_{(th)}$ can be given by $$\theta_{(th)} = 1.667 \times \frac{Hr}{A \times (1 + Icl)} \times (36.5 - Ta) + Ta \quad (8)$$

In this embodiment, the set temperature $\theta_{(th)}$ is obtained on the basis of the clothing thermal resistance Icl and the air temperature Ta, and the heater power $H\theta_{(th)}$ to be supplied to the heater 5-12 is controlled to make the sensor temperature Tcr coincide with the set temperature $\theta_{(th)}$, thus obtaining the equivalent temperature Teq* by calculating the following formula on the basis of the air temperature Ta, the clothing thermal resistance Icl, the set temperature $\theta_{(th)}$, and the heater power $H\theta_{(th)}$:

$$0.45 \times \theta_{(th)} + 0.55 \times Ta + \frac{0.24}{(1 + Icl)} \times \quad (9)$$

$$(36.5 - Ta) - \frac{0.45}{Hr} \times H\theta_{th}$$

Therefore, even if the air velocity Vair in a normal building office is high, an equivalent temperature can be accurately measured.

If, in equation (8), $$a_1 = 1.667 \times \frac{Hr}{A \times (1 + Icl)} \times 36.5$$

$$a_2 = 1 - 1.667 \times \frac{Hr}{A \times (1 + Icl)}$$

then $\theta_{(th)} = a_1 + a_2 \times Ta$.
If, in equation (9), $$b_1 = \frac{0.24}{1 + Icl} \times 36.5, b_2 = 0.45,$$

$$b_3 = 0.55 - \frac{0.24}{1 + Icl}, b_4 = + \frac{0.45}{Hr}$$

then, $$Teq = b_1 + b_2 \times \theta_{(th)} + b_3 \times Ta - b_4 \times H\theta_{(th)}$$

As is apparent from the above description, according to the thermal sensitivity calculating apparatus of the present invention, the sensor temperature Tcr is controlled to be equal to the set temperature $\theta_{(th)}$ which is not constant and changes depending on environmental conditions, and thermal sensitivity is calculated on the basis of the air temperature Ta, the clothing thermal resistance Icl, the set temperature $\theta_{(th)}$, and the thermal energy $H\theta_{(th)}$. Therefore, even if the air velocity Vair is high, the calculated thermal sensitivity coincides with thermal sensitivity felt by a human body with high accuracy, thus allowing accurate measurement of thermal sensitivity.

What is claimed is:

1. An apparatus for determining thermal sensitivity felt by a human in an environment through the use of an environment measuring module disposed within the environment, the apparatus comprising:

a surface temperature calculating means for receiving as input a clothing thermal resistance value Icl and an air temperature value Ta and outputting a predetermined surface temperature $\theta_{(th)}$ in accordance with equation A:

$$\theta_{(th)} = a_1 + a_2 \times Ta \quad (A)$$

where $$a_1 = 1.667 \times \frac{Hr}{A \times (1 + Icl)} \times 36.5$$

$$a_2 = 1 - 1.667 \times \frac{Hr}{A \times (1 + Icl)}$$

Hr is a radiation thermal transfer coefficient and
A is an intrinsic factor of the environment measuring module;

a thermal energy supply means for supplying an amount of thermal energy $H\theta_{(th)}$ to a heating means associated with the environment measuring module to maintain an actual surface temperature Tcr of the module substantially equal to the predetermined surface temperature $\theta_{(th)}$; and a thermal sensitivity calculating means for receiving as input the clothing thermal resistance value Icl, the air temperature value Ta, the predetermined surface temperature value $\theta_{(th)}$ and a value representing the amount of thermal energy $H\theta_{(th)}$ supplied to the heating means and outputting an equivalent temperature value Teq* representing the thermal sensitivity felt by the human in the environment calculated in accordance with equation B:

$$Teq^* = b_1 + b_2 \times \theta_{(th)} + b_3 \times Ta - b_4 \times H\theta_{(th)} \quad (B)$$

where $$b_1 = \frac{0.24}{1 + Icl} \times 36.5$$

$$b_2 = 0.45$$

$$b_3 = 0.55 - \frac{0.24}{1 + Icl}$$

and $$b_4 = +\frac{0.45}{Hr}.$$

2. The apparatus of claim 1, wherein the heating means is disposed within the environment measuring module for heating of the module.

3. The apparatus of claim 1, wherein the environment measuring module further comprises a temperature sensor disposed on a surface of the module for detecting the surface temperature Tcr.

4. The apparatus of claim 1, wherein the environment measuring module comprises a shape selected from the group consisting of a spherical shape, a hemispherical shape, a cylindrical shape and an elliptical shape, the module formed from a metal having a high thermal conductivity.

5. A thermal sensitivity determining apparatus for determining thermal sensitivity felt by a human in an environment, the apparatus comprising:
an environment measuring module disposed within the environment, a heating means disposed within the module for heating the module and a temperature sensor disposed on a surface of the module for detecting an actual surface temperature Tcr of the module;
a thermal energy supply means coupled to the environment measuring module for supplying an amount of thermal energy $H\theta_{(th)}$ to the heating means to maintain the actual surface temperature Tcr substantially equal to a predetermined surface temperature value $\theta_{(th)}$; and
a thermal sensitivity calculating unit coupled to both the environment measuring module and the thermal energy supply means, the thermal sensitivity calculating unit comprising a surface temperature calculating section for receiving as input a clothing thermal resistance value Icl and an air temperature value Ta and calculating the predetermined surface temperature value $\theta_{(th)}$ in accordance with equation A:

$$\theta_{(th)} = a_1 + a_2 \times Ta \tag{A}$$

where $$a_1 = 1.667 \times \frac{Hr}{A \times (1 + Icl)} \times 36.5$$

$$a_2 = 1 - 1.667 \times \frac{Hr}{A \times (1 + Icl)}$$

Hr is a radiation thermal transfer coefficient and A is an intrinsic factor of the environment measuring module,
and an equivalent temperature calculating section for receiving as input the clothing thermal resistance value Icl, the air temperature value Ta, the predetermined surface temperature value $\theta_{(th)}$ and a value representing the amount of thermal energy $H\theta_{(th)}$ supplied to the heating means and calculating an equivalent temperature Teq* representing the thermal sensitivity felt by the human in the environment in accordance with equation B:

$$Teq^* = b_1 + b_2 \times \theta_{(th)} + b_3 \times Ta - b_4 \times H\theta_{(th)} \tag{B}$$

where $$b_1 = \frac{0.24}{1 + Icl} \times 36.5$$

$$b_2 = 0.45$$

$$b_3 = 0.55 - \frac{0.24}{1 + Icl}$$

and $$b_4 = +\frac{0.45}{Hr}.$$

6. A method for determining thermal sensitivity felt by a human in an environment through the use of an environment measuring module disposed within the environment, the method comprising the steps of:
supplying an air temperature value Ta and a clothing thermal resistance value Icl to a surface temperature calculating section;
calculating a predetermined surface temperature value $\theta_{(th)}$ of the environment measuring module in accordance with equation A:

$$\theta_{(th)} = a_1 + a_2 \times Ta \tag{A}$$

where $$a_1 = 1.667 \times \frac{Hr}{A \times (1 + Icl)} \times 36.5$$

$$a_2 = 1 - 1.667 \times \frac{Hr}{A \times (1 + Icl)}$$

Hr is a radiation thermal transfer coefficient and A is an intrinsic factor of the environment measuring module;
supplying an amount of thermal energy $H\theta_{(th)}$ from a thermal energy supply means to a heating means associated with the environment measuring module to heat the module in accordance with a difference between an actual surface temperature Tcr of the module and the predetermined surface temperature value $\theta_{(th)}$ such that the actual surface temperature Tcr is maintained substantially equal to the predetermined surface temperature value $\theta_{(th)}$;
supplying the air temperature value Ta, the clothing thermal resistance value Icl, the predetermined surface temperature value $\theta_{(th)}$ and a value representing the amount of thermal energy $H\theta_{(th)}$ supplied to the heating means to a thermal sensitivity calculating section; and
calculating an equivalent temperature value Teq* representing the thermal sensitivity felt by the human in the environment in accordance with equation B:

$$Teq^* = b_1 + b_2 \times \theta_{(th)} + b_3 \times Ta - b_4 \times H\theta_{(th)} \tag{B}$$

where $$b_1 = \frac{0.24}{1 + Icl} \times 36.5$$

-continued $$b_2 = 0.45$$

$$b_3 = 0.55 - \frac{0.24}{1 + Icl}$$

and $$b_4 = +\frac{0.45}{Hr}.$$

7. A method for determining thermal sensitivity of an environment through the use of an environment measuring module disposed within the environment, the method comprising the steps of:

supplying an air temperature value Ta and a clothing thermal resistance value Icl to a surface temperature calculating section of a calculating unit;

calculating a predetermined surface temperature value $\theta_{(th)}$ in accordance with equation A:

$$\theta_{(th)} = a_1 + a_2 \times Ta \qquad (A)$$

where $$a_1 = 1.667 \times \frac{Hr}{A \times (1 + Icl)} \times 36.5$$

$$a_2 = 1 - 1.667 \times \frac{Hr}{A \times (1 + Icl)}$$

Hr is a radiation thermal transfer coefficient and A is an intrinsic factor of the environment measuring module;

supplying from an temperature sensor coupled to the environment measuring module to a thermal energy control section of the calculating unit an actual surface temperature Tcr of the module;

supplying from the thermal energy control section to a thermal energy supply means a thermal energy value $H\theta_{(th)}$ representing an amount of thermal energy that must be supplied to a heating means associated with the environment measuring module to maintain the actual surface temperature Tcr substantially equal to the predetermined surface temperature $\theta_{(th)}$;

supplying from the thermal energy supply means to the heating means thermal energy in accordance with the thermal energy value $H\theta_{(th)}$;

supplying the air temperature value Ta, the clothing thermal resistance value Icl, the predetermined surface temperature value $\theta_{(th)}$ and the thermal energy value $H\theta_{(th)}$ to an equivalent temperature calculating section of the calculating unit; and calculating an equivalent temperature Teq* representing the thermal sensitivity felt by the human in the environment in accordance with equation B:

$$Teq^* = b_1 + b_2 \times \theta_{(th)} + b_3 \times Ta - b_4 \times H\theta_{(th)} \qquad (B)$$

where $$b_1 = \frac{0.24}{1 + Icl} \times 36.5$$

$$b_2 = 0.45$$

$$b_3 = 0.55 - \frac{0.24}{1 + Icl}$$

and $$b_4 = +\frac{0.45}{Hr}.$$

* * * * *